(12) United States Patent
Hohner

(10) Patent No.: US 10,737,769 B1
(45) Date of Patent: Aug. 11, 2020

(54) TACTILE FEEDBACK AIRCRAFT CONTROL GRIP

(71) Applicant: Jack Hohner, Spokane, WA (US)

(72) Inventor: Jack Hohner, Spokane, WA (US)

( * ) Notice: Subject to any disclaimer, the term of this patent is extended or adjusted under 35 U.S.C. 154(b) by 522 days.

(21) Appl. No.: 15/437,448

(22) Filed: Feb. 21, 2017

(51) Int. Cl.
  *B64C 13/46* (2006.01)
  *B64C 13/50* (2006.01)
  *B64C 13/10* (2006.01)

(52) U.S. Cl.
  CPC .............. *B64C 13/46* (2013.01); *B64C 13/10* (2013.01); *B64C 13/50* (2013.01)

(58) Field of Classification Search
  CPC ....... B64C 13/46; B64C 13/10; B64C 13/345; B64C 13/507; G06F 3/016
  See application file for complete search history.

(56) References Cited

U.S. PATENT DOCUMENTS

| | | | | |
|---|---|---|---|---|
| 2,754,505 A * | 7/1956 | Kenyon | .................... | G01S 1/02 116/205 |
| 7,006,074 B2 * | 2/2006 | Chesters | ............... | G06F 3/0312 345/156 |
| 7,930,074 B2 * | 4/2011 | Cherepinsky | ........ | G05D 1/0858 701/12 |
| 8,240,617 B2 * | 8/2012 | Biest | ..................... | B64C 13/345 244/223 |
| 9,030,306 B2 * | 5/2015 | Lim | ........................ | G06F 3/016 340/407.1 |
| 9,606,633 B2 * | 3/2017 | Downey | ................. | G06F 3/023 |
| 9,857,873 B2 * | 1/2018 | Ito | ........................... | G06F 3/016 |
| 2007/0235594 A1 * | 10/2007 | Wingett | ............... | B64C 13/345 244/223 |
| 2008/0099629 A1 * | 5/2008 | Abel | ....................... | B64C 13/10 244/223 |

(Continued)

*Primary Examiner* — Philip J Bonzell
(74) *Attorney, Agent, or Firm* — Bacon & Thomas, PLLC

(57) ABSTRACT

A control grip for an aircraft control stick or yoke has within it electrically controlled actuators. Each actuator extends a thrust pin that corresponds with the fingertips of the pilot's hand that is holding the control grip. Additional thrust pins are positioned at the base of the thumb and base of the index finger. The actuators, upon receiving their electrical input, extend their thrust pin a small distance and press on the pilot's fingertips. This movement signals the pilot information that is currently conveyed to the pilot's eyes or ears through conventional instruments.

Angle of attack for "best rate of climb" would be indicated to the pilot by an extension of the thrust pin that corresponds to the third finger.
  Angle of attack for "best angle of climb" would be indicated by the extension of the thrust pin that corresponds to the pilot's second finger.
  Angle of attack at which the wing reaches aerodynamic stall would be indicated by the button that corresponds to the index finger.
  Thrust pins positioned at the base of the index finger and thumb will be used to indicate slip/skid attitude.

The thrust pins will be made to pulse as this is more effective for tactile feedback. Roll attitude can also be included in the thrust pins. Although the pin assignments listed are the primary functions, the thrust pins would not be limited to these functions. Additional actuators can be added to include other aircraft information.

9 Claims, 1 Drawing Sheet

(56) References Cited

U.S. PATENT DOCUMENTS

| | | | |
|---|---|---|---|
| 2008/0234881 A1* | 9/2008 | Cherepinsky | G05D 1/0858 701/7 |
| 2011/0024551 A1* | 2/2011 | Biest | B64C 27/26 244/6 |
| 2013/0088341 A1* | 4/2013 | Lim | G06F 3/016 340/407.1 |
| 2013/0221153 A1* | 8/2013 | Worsham, II | B64C 27/006 244/17.13 |
| 2014/0022064 A1* | 1/2014 | Ito | G06F 3/016 340/407.2 |
| 2016/0328024 A1* | 11/2016 | Downey | G06F 3/023 |

* cited by examiner

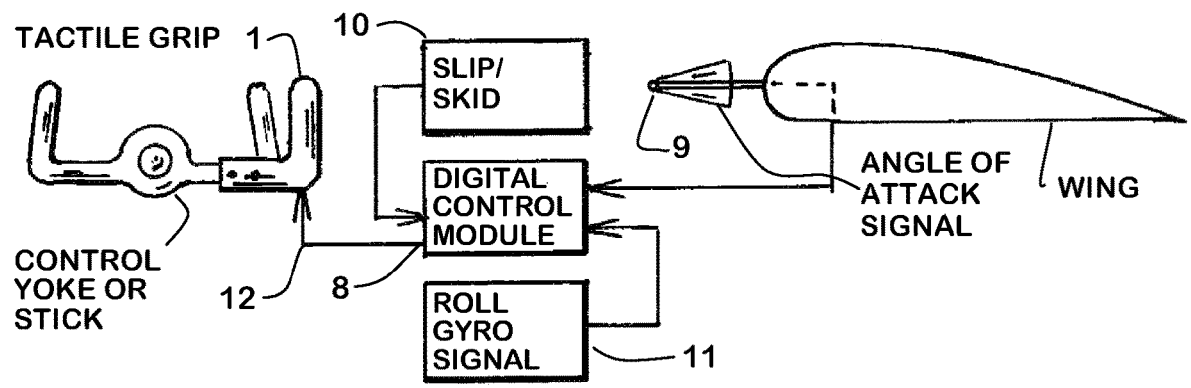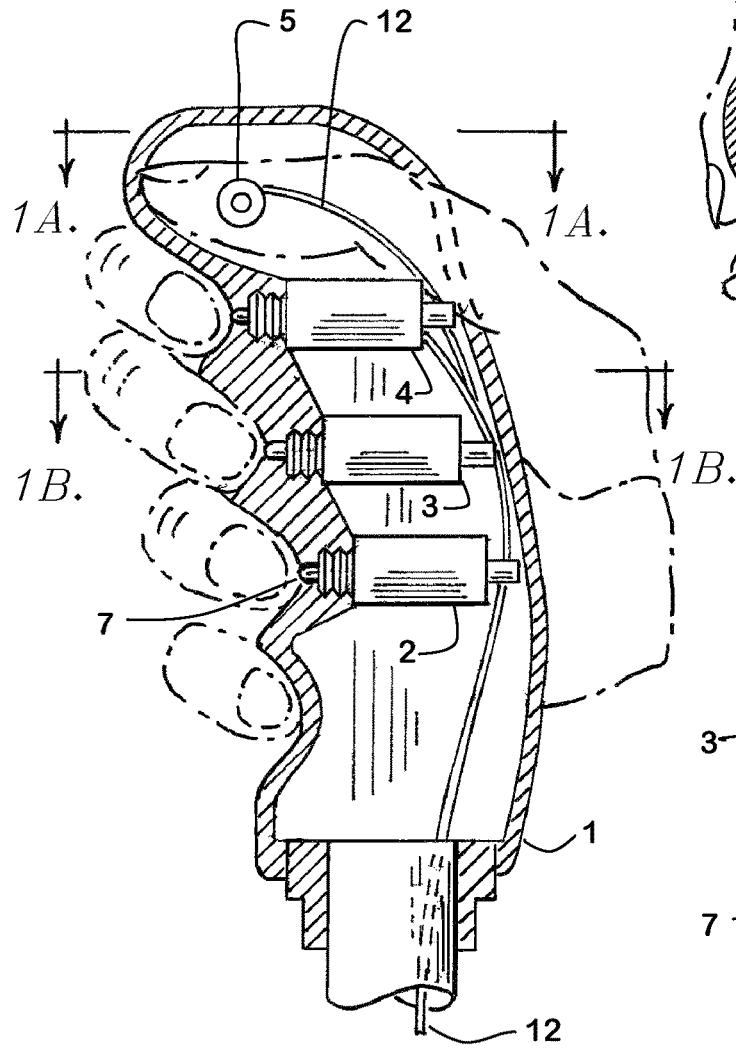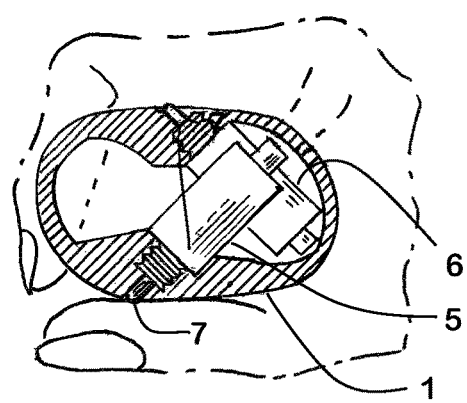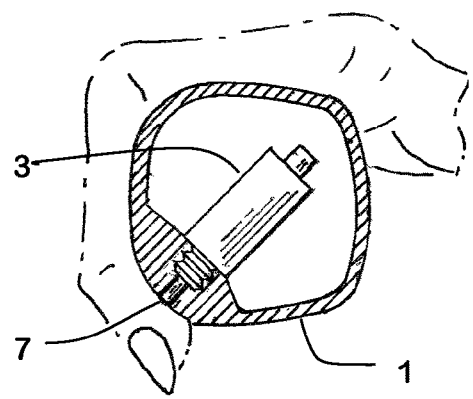

TACTILE FEEDBACK AIRCRAFT CONTROL GRIP

There are no patent applications related hereto previously filed in the United States nor in any foreign country.

FIELD OF INVENTION

This invention relates to control of an aircraft, and particularly to the control grip or yoke of an aircraft to help prevent accidents due to loss of control of the aircraft.

BACKGROUND OF THE INVENTION AND DESCRIPTION OF RELATED ART

The attitude of an aircraft, defined as pitch, roll and yaw, is crucial to safe operation.

Visual attitude indicating instruments are standard equipment in all aircraft. These consist of airspeed, altimeter, slip indicator, bank indicator, pitch indicator and others. In addition, certified aircraft require an audible stall warning. Also, some of the more complex aircraft include a stick shaker or stick pusher. This type of device sends attitude feedback to the pilot by employing a force on the control stick or yoke when the aircraft approaches a stall of the wing.

A drawback to visual instruments is that the pilot must divert his attention from outside the aircraft to the instruments. This is particularly critical when the aircraft is close to landing. The pilot's attention needs to be focused on the position of the runway relative to the aircraft. At the same time the pilot needs to monitor the aircraft attitude and airspeed by looking at the instruments. Many aircraft accidents are due to loss of control (LOC), when the pilot is making the final turn to landing. The audible stall indicator often is not recognized. This can be due to engine noise, turbulence, headphones, and other distractions. Stick shakers have been shown to be effective but generally are not seen on light aircraft because of the sophistication and cost.

My tactile feedback aircraft control grip resolves the aforementioned drawbacks to the visual and audio signals currently provided to the pilot for the purpose of maintaining safe aircraft attitude. It is also an improvement over the stick shaker and stick pusher as it signals the aircraft attitude to the pilot by actuators within the control grip that press on the pilot's fingertips.

It is known that the human fingertip has a higher concentration of nerve endings than most areas of the human body. Signals indicating aircraft attitude sent to each fingertip via an actuator are quickly learned and are much less subject to being overlooked.

Tactile feedback to the pilot is known in some variations. For example, Vavra, U.S. Pat. No. 4,484,191 A discloses a tactile feedback device that translates a signal from the slip indicator instrument and is sent to two vibrating devices located in the pilot's seat. The intention of these vibrators is to signal the pilot's legs. The leg receiving the signal is the one that should depress the rudder pedal. Also disclosed are variations on the stick pusher/shaker (Abel U.S. Pat. No. 7,658,349 B2); (Repperger U.S. Pat. No. 5,062,594 A); control wheel with haptic feedback (Springer U.S. Pat. No. 8,364,342 B2).

Also disclosed is a thumb-only haptic feedback device (Holcombe U.S. Pat. No. 2,657,476) and a thumb and index finger only haptic feedback device (Kenyon U.S. Pat. No. 2,754,505 A).

My device is an improvement as it provides haptic feedback of "angle of attack" and slip/skid attitude as the primary attitude information to be conveyed to the pilot. Another improvement over the previous art is that my invention adds haptic feedback to multiple fingers and thumb, multiple positions on finger(s) and thumb, and the option to transmit haptic signals to various positions on the palm and hand. Another improvement is haptic feedback is proven to be more effective with pulses rather than the signal provided by a single extension of the moveable feeler element.

Various drawbacks of the sited prior art are also eliminated by the use of modern microprocessor technology.

My invention does not reside in any single one of the identified features individually, but rather in the synergistic combination of all of its structures, which give rise to the functions necessarily flowing therefrom as hereinafter specified and claimed.

BRIEF SUMMARY OF INVENTION

A tactile feedback aircraft control grip that provides aircraft attitude information to the pilot by means of electronic actuators within the apparatus. This information conveyed to the pilot through fingers and hand placed on the control grip will reduce the occurrence of "loss of control" (LOC) of the aircraft and thus reduce the number of aircraft accidents.

In providing such a LOC safety device, it is:

a principal object to provide information for the prevention of inadvertent wing stall.

a further object to provide information for the prevention of inadvertent uncoordinated turning attitude.

a further object to provide best rate of climb information.

a further object to provide best angle of climb information.

a further object to provide best glide angle information.

a further object to provide aircraft roll information.

a further object to provide ease of installation for LOC prevention device.

a further object to provide a reasonable cost for LOC prevention device.

a further object to provide a wide applicability to the General Aviation fleet.

a further object to increase aircraft safety by prevention of LOC per the FAA "fly safe" campaign.

Other and further objects of my invention will appear from the following specification and accompanying drawings which form a part hereof. In carrying out the objects of my invention, it is to be understood that its structures, features and steps are susceptible to change in design and arrangement and order with only one preferred and practical embodiment of the best known mode being illustrated in the accompanying drawings and specified as is required.

BRIEF DESCRIPTION OF THE SEVERAL VIEWS OF THE DRAWING

Specific forms, configuration, embodiments and/or diagrams relating to and helping to describe preferred versions of our invention are explained and characterized herein, often with reference to the accompanying drawings. The drawings and all features shown therein also serve as part of the disclosure of my invention, whether described in text or merely by graphical disclosure alone. Such drawings are briefly described below.

FIG. 1 is a sketch of a cross section view of the tactile control grip showing a configuration with solenoid electronic actuators.

FIG. 1A is a cross section view near the top of the grip showing how the index finger and thumb wrap around the grip. It also shows the actuators in relation to the index finger and thumb and how the actuator thrust pin engages the finger and thumb.

FIG. 1B is a cross section further down the grip showing the middle finger wrapping around the grip. It also shows how a third actuator presses against the fingertip. This layout is repeated for the index fingertip and the fingertip of the fourth finger. A sixth actuator could be added to signal the fifth finger.

FIG. 2 is a flow diagram of relationship of the angle of attack signal generator, the slip/skid signal generator and the roll gyro signal generator to the digital control module. The control module processes the signals and actuates the electronic actuators accordingly.

DETAILED DESCRIPTION OF THE INVENTION

My tactile grip 1, (FIG. 1) generally provides a form fitting hand grip with actuator 2 mounted in the interior cavity of the grip. The thrust pin 7, can be assigned various attitude signals to generate a pressing force on the third finger. In the configuration shown actuator 2 would be assigned the wing angle of attack signal that indicates best rate of climb for the aircraft.

Actuator 3 works in the same manner as actuator 2. In the configuration shown actuator 3 would be assigned the wing angle of attack signal for the best angle of climb for the aircraft.

Actuator 4 works in the same manner as actuators 3 and 4. In the configuration shown actuator 4 would be assigned the wing angle of attack signal for when the wing is close to aerodynamic stall.

Actuator 5 presses on the inside of the thumb and actuator 6 presses on the lower part of the index finger. In the configuration shown, these two actuators would provide the pilot the coordination attitude of the aircraft. When the aircraft is banked to the left but lacks the appropriate rudder input for a coordinated turn, then the left actuator 5 would signal the pilot to step on the left rudder pedal. Actuator 6 correspondingly signals the pilot when right rudder needs to be applied to achieve and maintain a coordinated turn.

All five actuators shown are output devices that receive their electrical signals from the digital control module via electrical cable 12.

The digital control module 8, (FIG. 2) receives input from the angle of attack sensor 9, mounted on the exterior of the aircraft. The digital control module 8, also receives the signal from the slip/skid sensor 10.

In a further embodiment other sensors can be added in addition to these primary sensors such as a gyroscope sensing roll attitude 11.

The digital control module processes these signals and sends the appropriate output to the tactile grip 1, via electrical cable 12, which in turn powers the actuators to signal the appropriate finger with pulses of the actuator thrust pins 7. This provides the pilot with tactile sensory feedback of the attitude of the aircraft.

Having thusly described my invention, I file this Non-Provisional Patent Application.

What I claim is:

1. An aircraft control grip providing to a pilot haptic feedback relating to at least one aircraft attitude, comprising:
   a control grip body formed to be gripped by a user's hand;
   at least one electronic actuator disposed in said grip body, the at least one electronic actuator having a thrust pin responsive to an electrical signal to move outward from said control grip body to generate a pressing force against a part of the user's hand; and
   a control module configured to receive at least one attitude signal from at least one sensor configured to sense and report at least one attitude of the aircraft, and to output an activating signal to said at least one electronic actuator;
   whereby said activating signal causes said electronic actuator to drive said pin to generate said pressing force against the part of the user's hand when said attitude signal reaches a defined threshold.

2. The aircraft control grip according to claim 1, wherein said activating signal comprises a pattern of pulses.

3. The aircraft control grip according to claim 1, wherein said at least one attitude signal comprises an aircraft angle of attack signal.

4. The aircraft control grip according to claim 1, wherein said at least one attitude signal comprises a slip/skid signal.

5. The aircraft control grip according to claim 1, wherein said at least one attitude signal comprises a roll signal.

6. The aircraft control grip according to claim 1, wherein said at least one electronic actuator comprises a first and a second electronic actuator each arranged in said control grip body to direct said pressing force against a respective different finger of the user's hand,
   wherein a first actuating signal corresponding to a first attitude signal is provided by said control module to drive said first electronic actuator, and a second actuating signal corresponding to a second attitude signal is provided by said control module to drive said second electronic actuator, and
   wherein said first actuating signal comprises a first pattern of pulses, and said second actuating signal comprises a second pattern of pulses different from said first pattern.

7. The aircraft control grip according to claim 1, wherein said control grip body is formed to guide at least one finger of the user's hand over the thrust pin of said at least one actuator.

8. The aircraft control grip according to claim 1, wherein said control grip body is formed to guide at least one finger of the user's hand over the thrust pin of said at least one actuator.

9. The aircraft control grip according to claim 1, wherein said at least one electronic actuator comprises a first and a second electronic actuator each arranged in said control grip body, and
   said control grip body is formed to guide a first finger of the user's hand over a thrust pin of said first electronic actuator, and to guide a second finger of the user's hand over a thrust pin of said second electronic actuator.

* * * * *